United States Patent [19]
Tanaka et al.

[11] Patent Number: 5,570,199
[45] Date of Patent: Oct. 29, 1996

[54] IMAGE PROCESSING DEVICE AND METHOD

[75] Inventors: Yasuyuki Tanaka, Tokyo; Hidenori Hoshi, Kawasaki, both of Japan

[73] Assignee: Canon Kabushiki Kaisha, Tokyo, Japan

[21] Appl. No.: 163,003

[22] Filed: Dec. 8, 1993

[30] Foreign Application Priority Data

Dec. 28, 1992 [JP] Japan .................................. 4-360137

[51] Int. Cl.⁶ ..................................................... H04N 7/30
[52] U.S. Cl. ........................... 386/95; 348/405; 348/407; 386/111
[58] Field of Search ..................................... 358/335, 312, 358/336; 348/405, 407, 413, 416, 699; H04N 7/133, 7/30, 7/50

[56] References Cited

U.S. PATENT DOCUMENTS

| | | | |
|---|---|---|---|
| 4,807,033 | 2/1989 | Keesen et al. | 348/616 |
| 4,849,812 | 7/1989 | Borgers | 348/407 |
| 5,351,131 | 9/1994 | Nishino | 348/405 |
| 5,400,076 | 3/1995 | Iwamura | 348/413 |

FOREIGN PATENT DOCUMENTS

| | | |
|---|---|---|
| 282135A1 | 3/1988 | European Pat. Off. . |
| 415699A3 | 10/1991 | European Pat. Off. . |
| 493128A2 | 12/1991 | European Pat. Off. . |
| 510972A2 | 10/1992 | European Pat. Off. . |

OTHER PUBLICATIONS

IEEE Transactions on Communications, vol. COM–29, No. 12, Dec. 1981, New York, US, pp. 1754–1762, Mitchell et al., "Channel Recovery For Transform Image Coding".

1992 IEEE International Symposium on Circuits and Systems, San Diego (US), 10–13 May 1992, Barbero et al: "A Hybrid DCT Codec: Performance at Low–Bit–Rates and In the Presence of Transmission Errors", vol. 1 of 6, pp. 188–191.

IEEE Transactions on Consumer Electronics, vol. 38, No. 3, Aug. 1992, New York, US, pp. 108–117, H. Sun et al., "Error Concealment In Digital Simulcast AD–HDTV Decoder".

*Primary Examiner*—Howard W. Britton
*Attorney, Agent, or Firm*—Fitzpatrick, Cella, Harper & Scinto

[57] ABSTRACT

Motion in an image signal to be transmitted is detected to produce motion information. An encoded image signal comprising the image signal and the motion information is transmitted to a transmitting path. The encoded image signal is received from the transmitting path, and code errors are concealed according to an operating characteristic determined on the basis of the motion information.

32 Claims, 13 Drawing Sheets

IMAGE PROCESSING DEVICE AND METHOD

FIELD OF THE INVENTION

This invention relates to an image processing device and method and, in particular, a device and method which conceals code errors or detects motion of the image.

DESCRIPTION OF THE PRIOR ART

Recently, so-called high-efficiency encoding systems have been developed, such as encoding systems using an orthogonal transformation which are the subject of attention in this art area. Specifically, the system using a Discrete Cosine Transformation (DCT) is used to great benefit because of its high efficiency of encoding and the fact that it is readily put into practice.

For example, an image recording and reproducing apparatus and an image transmitting system comprising a transmitter and a receiver use the encoding system using the DCT. A digital video tape recorder (DVTR) is an example of one of such recording and reproducing apparatus.

It is well-known that the DCT is carried out for image blocks, each composed of a plurality of pixels. In a reproducing process of the DVTR, when uncorrectable code errors are detected in a certain block and the image of the block is supposed to be damaged, the block should be concealed. One method for concealing the block is to replace the damaged block with one copied from a previous frame.

However, if the damaged block in a motion area of the image is replaced with a block from the previous frame, the portion of the image being replaced makes the image awkward. Because the damaged block and the block in the previous frame are considerably different from each other, even if the block in the previous frame was located at the same position as the damaged block.

Therefore, a system which changes a method of concealing in accordance with a motion of the image has been proposed. In short, in such system, the damaged block in a still area is replaced with the block in the previous frame and the damaged block in a motion area is interpolated by using surrounding blocks in the same frame.

However, a motion detection circuit generally needs a large amount of circuit elements and makes the reproducing device, especially the receiver, large and expensive. Especially, it is considered that a number of receivers for a home use is much more than that of transmitters used in broadcasting station. Accordingly, large and expensive receivers present a problem of preventing the use of such a system for broadcasting. For all that, the motion detecting circuit cannot be reduced, because such reduced motion detecting circuit causes the accuracy of detecting to decline, leading to an inferior image.

SUMMARY OF THE INVENTION

An object of the invention is to provide an image signal reproducing device in which code errors are properly concealed, without utilizing a large number of circuit elements.

An error concealing characteristic is decided, according to one aspect of the present invention, in accordance with subordinate data indicating an encoding characteristic of encoded image data, said subordinate data being transmitted with the encoded image data.

An error concealing characteristic is determined, according to another aspect of the present invention, in accordance with motion data indicating whether or not the image data involves motion, said motion data being transmitted with image data.

An error concealing characteristic is determined, according to a further aspect of the present invention, in accordance with AC component information indicating energies of alternating components of image data.

Another object of the present invention is to provide an image signal processing device by which a motion involved in the image signal is accurately detected utilizing a large number of circuit elements.

The motion involved in the image signal is detected, according to a further aspect of the present invention, on the basis of AC component information indicating energies of alternating components of the image data.

A further object of the present invention is to provide an image signal processing method by which code errors are properly concealed without increasing circuit elements of the image receiving device.

The motion involved in the image signal is detected, according to a further aspect of the present invention, before the image data is transmitted, and an error concealing characteristic is determined by the transmitted motion information of the image signal.

Other objects of the invention and other aspects of the invention will be apparent from the following description and drawings.

DETAILED DESCRIPTION OF EXEMPLARY EMBODIMENTS

Embodiments of the present invention will now be described, by way of example only, with reference to the accompanying drawings.

Figure 1:
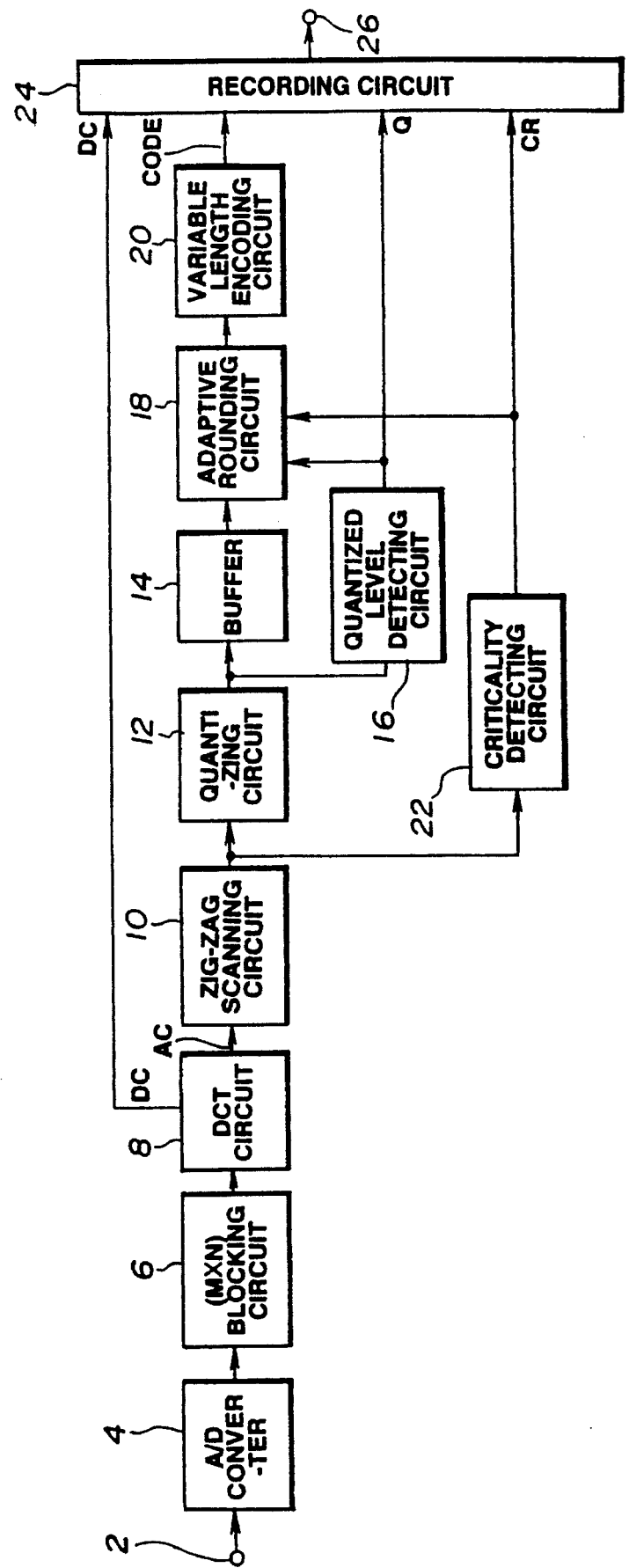
FIG. 1 is a block diagram showing a primary part of an image signal recording apparatus according to a first embodiment of the present invention.

FIG. 1 is a block diagram of an image signal recording apparatus of a first embodiment of the present invention. In FIG. 1, an original analogue image signal is input to an input terminal 2.

The analogue image signal is digitized by an analogue-to-digital (A/D) converter 4, and the digitized image signal is divided into blocks each of which is composed of (M×N) pixels having M pixels in a horizontal direction (a row) and N pixels in a vertical direction (a column) by a (M×N) blocking circuit 6.

Figure 2:
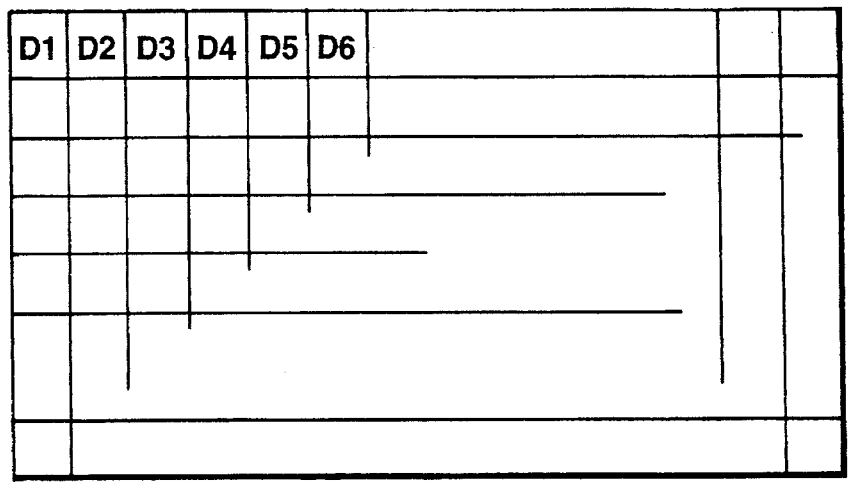
FIG. 2 shows how a frame of an image is divided into blocks in the apparatus shown in FIG. 1.
Figure 3:
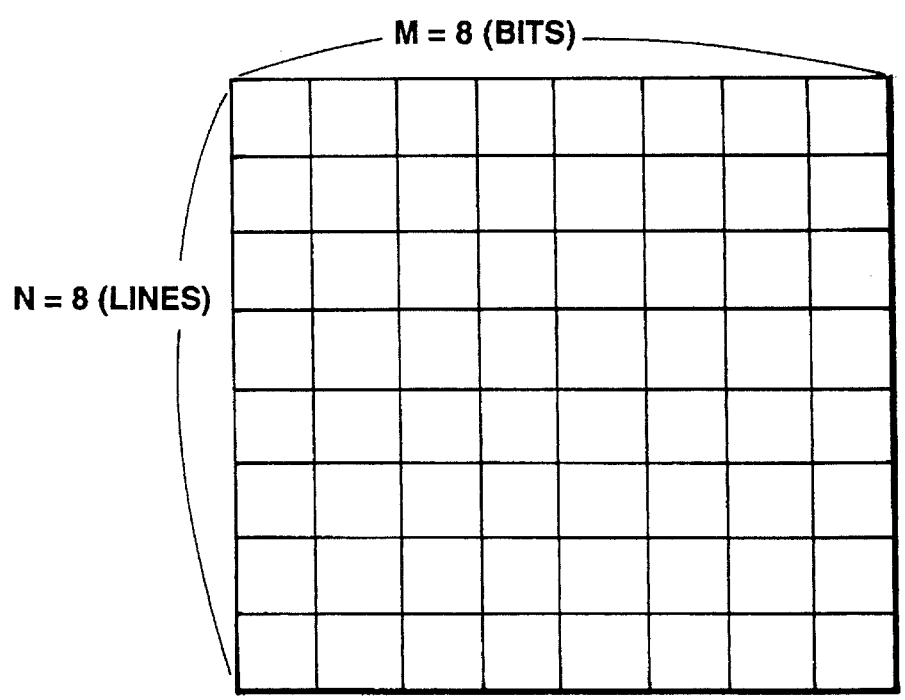
FIG. 3 shows a structure of each block.

FIG. 2 shows a model of dividing a frame into blocks, shows as D1,D2,D3, . . . . When it is assumed that each of M and N is 8, one block is composed of 64 pixels as shown in FIG. 3.

Figure 4:
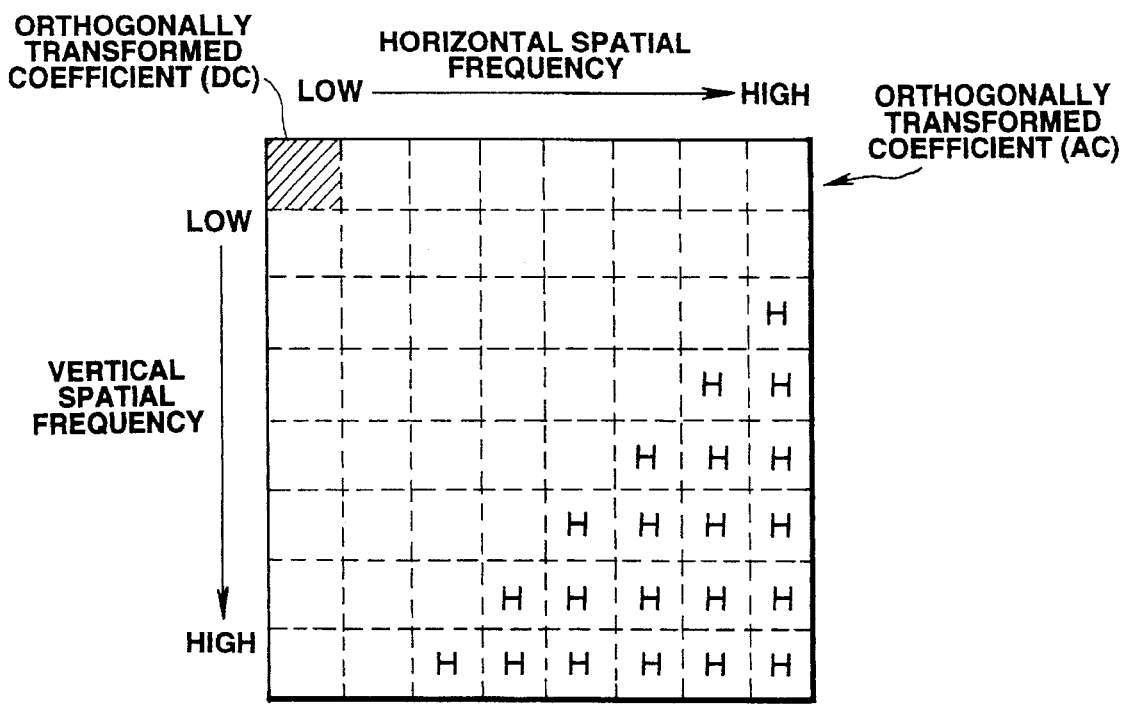
FIG. 4 shows a structure of an orthogonal transformed block composed of a plurality of coefficients and shows a zero frequency (DC) coefficient and high frequency coefficients.

The image signal divided into blocks by the circuit 6 is orthogonal-transformed by Discrete Cosine Transforming (DCT) circuit 8. FIG. 4 shows DCT coefficients which compose a block orthogonally transformed according to the DCT by the DCT circuit 8. These coefficients are distinguished between a "direct current" (zero spatial frequency) coefficient hatched in FIG. 4, hereinafter called a DC component, and "alternating current" (non-zero spatial frequency) coefficients, hereinafter called AC components.

Figure 5:
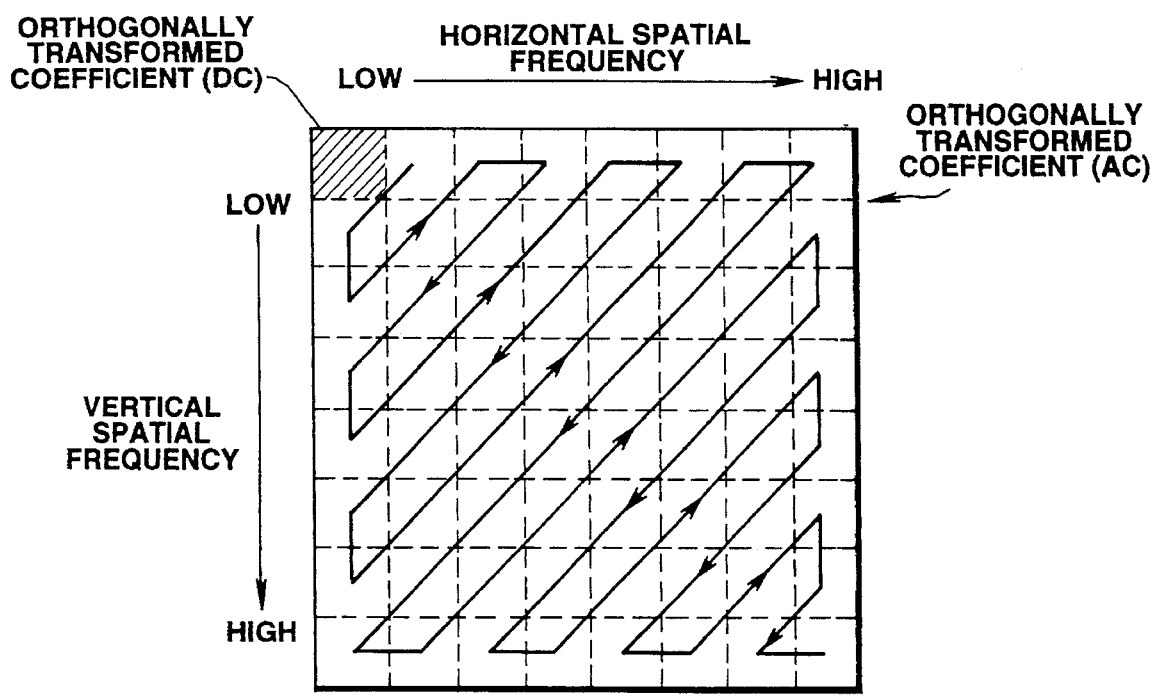
FIG. 5 shows how to zig-zag scan the orthogonal transformed block shown in FIG. 4.

The AC components output from the DCT circuit 8 are supplied to a zig-zag scanning circuit 10 and are scanned from a low frequency to a high frequency in a two-dimensional frequency region as shown in FIG. 5. The AC components are supplied to a quantizing circuit 12 and a criticality detecting circuit 22 in the order scanned in the zig-zag scanning circuit 10.

The quantizing circuit 12 quantizes the AC components by using an appropriate table selected from among a plurality of quantizing tables. The appropriate table is selected so that an amount of data output from the quantizing circuit 12 becomes uniform in a certain unit of the image signal, for example one frame, one field, several lines, or a predetermined number of the blocks.

The quantized data are supplied to a buffer 14 and a quantized level detecting circuit 16. The quantized level detecting circuit 16 detects a table number used in the quantizing circuit 12 and outputs it as a quantizing factor Q. Accordingly, the image data is formed into units of a uniform size, adapted to predetermined data format, for recording on a magnetic tape, reproducing from the tape at any speed, or transmitting to a satellite.

Figure 6:
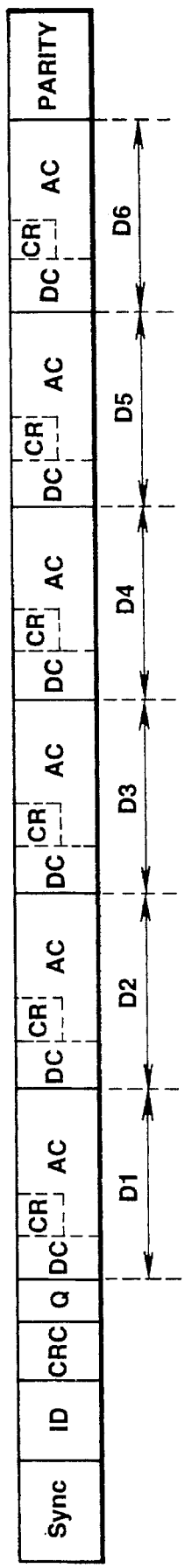
FIG. 6 shows a structure of a transmitting signal output from the apparatus shown in FIG. 1.

FIG. 6 shows a structure of a transmitting signal according to a predetermined format in which the amount of data is made uniform in every six DCT blocks and one synchronizing block comprises data of six DCT blocks. FIG. 6 is a diagrammatic representation of the basic signal format. In this figure the height of the longitudinal row represents 8 bits, i.e. one byte. The top left hand corner of the row represents the first synchronising bit. Thus successive bytes are effectively arranged side-by-side transverse to the longitudinal axis of the row. When the data is transmitted it is transmitted serially starting with the first synchronising bit.

In FIG. 6, CR indicates a criticality of each block. The criticality is detected in the criticality detecting circuit 22 by a method, for example, as follows.

In each unit, which is composed of six DCT blocks in this embodiment, there might be a block having many high frequency coefficients and a block having few high frequency coefficients. If all of blocks in each unit are quantized by a common characteristic, it will appear that an image feature in the block having many high frequency coefficients and an image feature in the block having few high frequency coefficients have different levels of definition. The criticalities are used for compensating for such difference by adjusting the quantizing characteristic in an adaptive rounding circuit 18.

Firstly, the criticality detecting circuit 22 compares each of the values of high frequency coefficients in each DCT block (shown in FIG. 4 as H) with a predetermined value. Secondly, the circuit 22 counts a number of high frequency coefficients having a value exceeding the predetermined value in each DCT block, and classifies each DCT block into several, e.g. four, classes on the basis of the counted number. These classes represent characteristics of images in each of DCT blocks. The criticality detecting circuit 22 outputs the criticality composed of several, e.g. two, bits which indicates one of the classes. The criticality is shown as CR in FIG. 1 and is essential to adjust the quantizing characteristic.

The adaptive rounding circuit 18 receives quantized coefficient data via the buffer 14 and adaptively rounds off less significant bits thereof according to the criticality CR and the quantizing factor Q for each DCT block. The output data of the adaptive rounding circuit 18 are supplied to a variable length encoding circuit 20 and are encoded by a given encoding method which combines a number of continuous 0 coefficients and coefficients of 1 or more and assigns codes to such combinations. Accordingly, the variable encoding circuit 20 outputs remarkably compressed codes representing AC components.

The compressed codes of the AC components, shown in FIG. 1 as CODE, the DC component, the quantizing factors Q, and the criticalities CR are input to a recording circuit 24. The recording circuit 24 forms the synchronizing block as shown in FIG. 6. In FIG. 6, Sync indicates synchronizing codes which are used for picking up all codes in a reproducing system. ID indicates identification codes including a frame number and so on, CRC indicates a Cyclic Redundancy Check code as error check codes for the identification codes ID, and Parity indicates parity codes composing an error correction code. The recording circuit 24 forms these codes and forms the synchronizing blocks each of which is composed of the synchronizing codes (Sync), identification codes (ID), error check codes (CRC), the quantizing factor (Q), six groups of main codes, each of which is composed of one DC component (DC), the criticality (CR), and compressed codes (AC), and the parity codes (Parity). Each of DC components (DC) and the criticalities (CR) in a respective group corresponds to a respective DCT block. But the boundary of compressed codes (AC) between adjacent DCT block varies according to the characteristic of the image.

The recording circuit 24 constantly outputs such a synchronizing block as the transmitting signal. The transmitting signal is supplied to a transmitting path, e.g. a magnetic tape, to be recorded on, via an output terminal 26.

Figure 7:
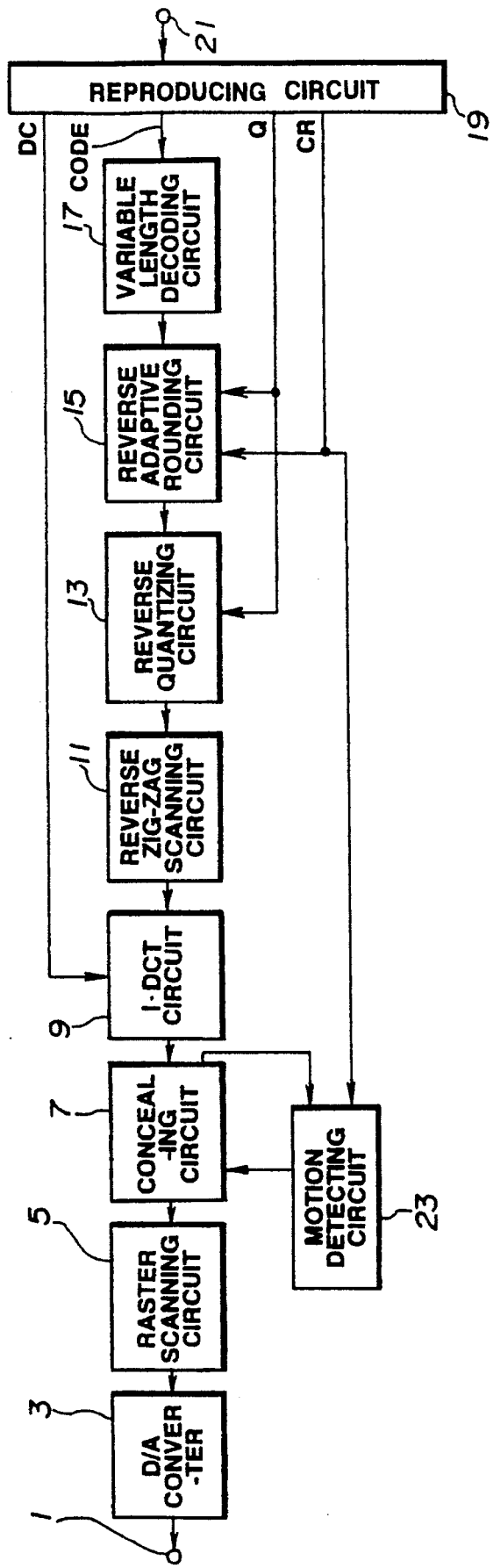
FIG. 7 is a block diagram showing a primary part of an image signal reproducing apparatus according to the first embodiment of the present invention, for reproducing an image signal from the transmitted signal transmitted by the apparatus shown in FIG. 1.

FIG. 7 shows a reproducing (receiving) apparatus which reproduces the image signal from the transmitting signal transmitted by the apparatus shown in FIG. 1, as the first embodiment of the present invention.

In FIG. 7, an input terminal 21 receives the transmitting signal transmitted via the transmitting path, e.g. the magnetic tape, and supplies it to a reproducing circuit 19. The reproducing circuit 19 reproduces a code sequence on the basis of the synchronizing codes, and separates the DC components (DC), the compressed AC components (AC), the quantizing factors (Q), and the criticalities (CR) from the code sequence, and corrects correctable code errors by using the parity codes.

The compressed AC components (AC) are decoded by a variable length decoding circuit 17 and the AC components are reproduced therein. The AC components output from the decoding circuit 17 are supplied to a reverse rounding circuit 15 and are adaptively rounded out by adding less significant bits according to the quantizing factor (Q) and the criticalities (CR) separated by the reproducing circuit 19. The process of rounding out (reverse-rounding off) is adaptively carried out for each DCT block.

A reverse-quantizing circuit 13 reverse-quantizes the AC components according to the quantizing factors (Q). The AC components output from the reverse-quantizing circuit 13 are supplied to a reverse zig-zag scanning circuit 11 and are output therefrom in the original order. An inverse Discrete Cosine Transforming (I-DCT) circuit 9 orthogonally transforms the AC components output from the reverse zig-zag scanning circuit 11 and the DC component separated by the reproducing circuit 9 from a frequency domain to an amplitude domain. Further, error flags indicating that uncorrectable errors have occurred in each DCT block are supplied from the reproducing circuit 19 to the I-DCT circuit 9 with the DC components.

The I-DCT circuit 9 outputs the image signal with the error flags in units of blocks and supplies it to a concealing circuit 7. The concealing circuit 7 operates according to a result of detecting motion by a motion detecting circuit 23. The operation of the concealing circuit 7 and the motion detecting circuit 23 will be described in detail hereinafter.

The image signal output from the concealing circuit 7 is supplied to a raster scanning circuit 5 which outputs the image signal in an order which corresponds to a raster scanning. The image signal output from the raster scanning circuit 5 is converted to an analogue image signal by a digital-to-analogue (D/A) converter 3. The analogue image signal output from the D/A converter 3 is externally output via an output terminal 1.

Figure 8:
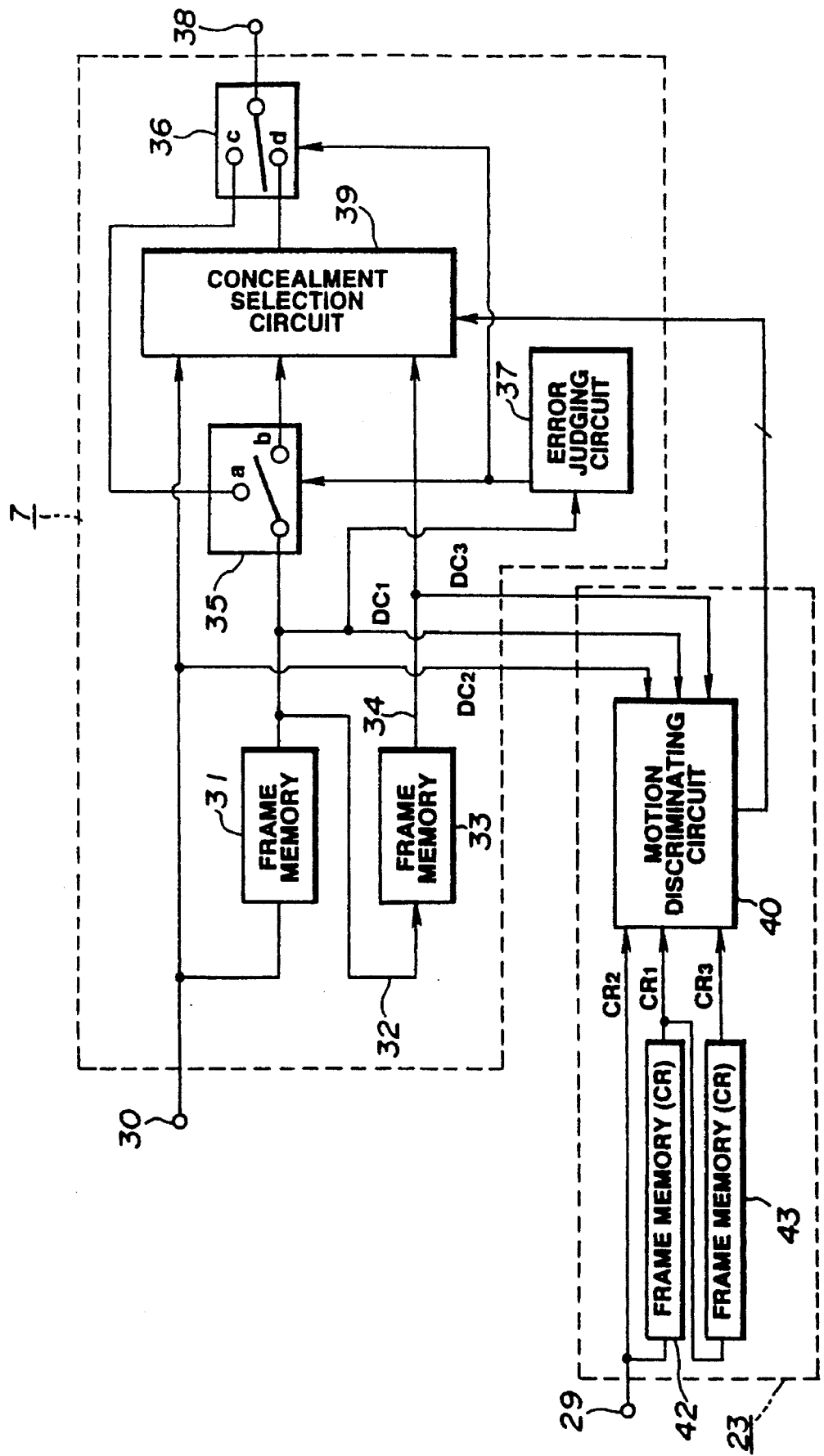
FIG. 8 is a block diagram which shows details of the concealing circuit and the motion detecting circuit, which are shown generally in FIG. 7.

The detailed operation of the concealing circuit 7 and the motion detecting circuit 23 are described below. FIG. 8 is a block diagram of the concealing circuit 7 and motion detecting circuit 23. The image signal to be concealed and error flags are input via an input terminal 30. The criticalities CR are input via an input terminal 29. The motion detecting circuit 23 detects whether or not motion is involved in the image between the present frame and the previous frame and between the present frame and the following frame. The concealing circuit 7 adaptively conceals a block having an uncorrectable code error on the basis of the result of such detection.

The image signal and error flags input to the terminal 30 are delayed for one frame period by a frame memory 31. The delayed image signal output from the frame memory 31 are delayed for another one frame period by a frame memory 33. After this, the delayed image signal from frame memory 31 is treated as an image signal in the present frame. The error flags which are attached at the head of respective blocks are detected by an error judging circuit 37. The error judging circuit 37 outputs a control signal which indicates whether or not the block output from the frame memory 31 includes uncorrectable errors on the basis of the error flags.

Switches 35, 36 are controlled by the control signal produced by the error judging circuit 37. Therefore, a block including no errors output from the frame memory 31 is directly output from an output terminal 38 to the raster scanning circuit 5 shown in FIG. 7 via a terminal "a" of the switch 35 and a terminal "c" of the switch 36.

When a block including uncorrectable errors is output from the frame memory 34, the control signal lets the switch 35 connect to a terminal "b" and lets the switch 36 connect to a terminal "d". In short, the image signal of the present frame output from the frame memory 31 is supplied to a concealment selection circuit 39, and an output signal, as an interpolating signal, output from the concealment selection 39 is output from the terminal 38 instead of the block having uncorrectable errors.

A motion discriminating circuit 40 picks up DC components of the present frame DC1 from the image signal output from the frame memory 31, picks up DC components of the following frame DC2 from the image signal input to the input terminal 30 and picks up DC components of the previous frame DC3 from the image signal output from the frame memory 33. These DC components are the most important components of the orthogonally transformed block and, what is more, there is a relatively high possibility that they reproduced correctly because they are encoded by a fixed length encoding, compared to the AC components encoded by a variable length encoding. Therefore the DC components DC1, DC2, DC3 are supplied to the motion discriminating circuit.

The criticalities input to the input terminal 29 are supplied to the motion discriminating circuit 40 as criticalities of the following frame CR2, and are delayed for one frame period of time by a frame memory 42. The criticalities output from the frame memory 42 are supplied to the motion discriminating circuit 40 as criticalities of the present frame CR1, and are delayed for another frame period of time by a frame memory 43. The criticalities output from the frame memory 43 are supplied to the motion discriminating circuit 40 as criticalities of the previous frame. The memories 42 and 43 have a much smaller capacity than that of the frame memories 31 and 33, because the criticalities have less data, e.g. only two bits for each DCT block.

Figure 9:
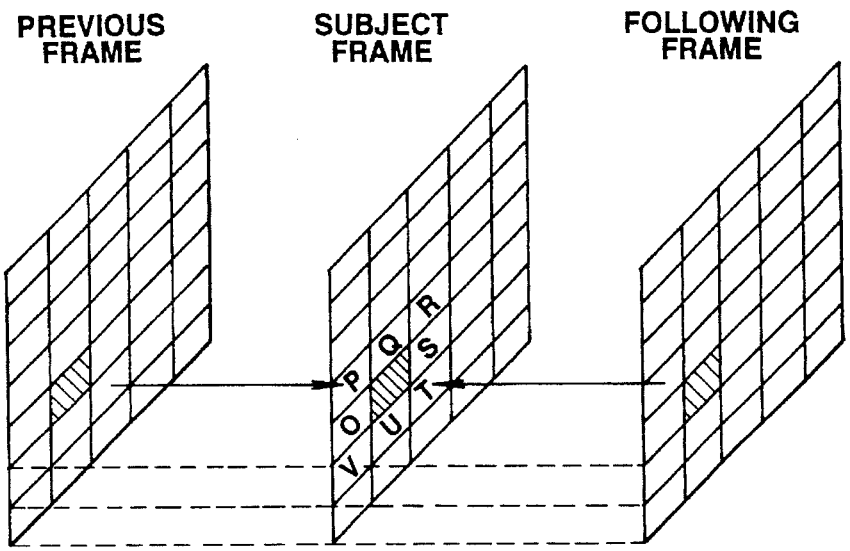
FIG. 9 is a model of a part of the image signal used for explaining one method of interpolation.

The operation of the motion discriminating circuit 40 will be described below with reference to FIG. 9 and Table 1.

| judging pattern | judging parameter | results of comparisons | | final judgements | | adaptive interpolation |
|---|---|---|---|---|---|---|
| | | previous frame | following frame | previous frame | following frame | |
| 1 | DC | 0 | 0 | 0 | 0 | intra-frame |
| | CR | 0 | 0 | | | |
| 2 | DC/CR | 0 | 0 | — | 0 | intra-frame |
| | CR/DC | x | 0 | | | |
| 3 | DC/CR | 0 | 0 | 0 | — | intra-frame |
| | CR/DC | 0 | x | | | |
| 4 | DC/CR | 0 | 0 | 0 | 0 | intra-frame |
| | CR/DC | x | x | | | |
| 5 | DC | x | 0 | x | 0 | previous frame |
| | CR | x | 0 | | | |
| 6 | DC/CR | x | 0 | 0 | 0 | intra-frame |
| | CR/DC | 0 | x | | | |
| 7 | DC/CR | x | 0 | x | — | previous frame |
| | CR/DC | x | x | | | |
| 8 | DC | 0 | x | 0 | x | following frame |
| | CR | 0 | x | | | |
| 9 | DC/CR | 0 | x | — | x | following frame |
| | CR/DC | x | x | | | |
| 10 | DC | x | x | x | x | average value of previous and following frames or either previous or following frame |
| | CR | x | x | | | |

The motion discriminating circuit 40 compares the DC component DC1 with the DC component DC2, and produces a judging result. The judging result is produced on the basis of whether or not the absolute value of the difference between DC1 and DC2 exceeds a predetermined threshold value. When the absolute value exceeds the threshold value, the judging result indicates an existence of motion that is shown as "0" on the line of DC at the column of following frame of result of comparisons in the Table 1. Similarly, the existence of motion is judged by comparing DC1 with DC3, and is shown on the line of DC at the column of previous frame of results of comparisons. Further the existence of a motion is also judged by comparing CR1 with CR2 and by CR1 with CR3. These results are shown on the line of CR at the columns of results of comparisons.

A judging pattern 1 shown in Table 1 indicates that all of the comparison results indicate the existence of motion. In this pattern, final judgements for previous and following frames naturally indicate the existence of motion "0", and the interpolation must be the intra-frame interpolation. For example, in the subject (present) frame in FIG. 9, the subject block to be concealed which is hatched is interpolated by using adjacent blocks, e.g. blocks O,P,Q,R,S,T,U and V.

A judging pattern 2 includes two cases. One indicates that both results concerned with the previous and following frames indicate the existence of motion on the basis of the DC components, and a result concerned with the previous frame indicates no motion but a result concerned with the following frame indicates the existence of motion on the basis of the criticalities CR (AC components). The other indicates that both results concerned with the previous and following frames indicate the existence of motion on the basis of the criticalities CR, and a result concerned with the previous frame indicates no motion but a result concerned with the following frame indicates the existence of motion on the basis of the DC components DC. In this pattern, the final judgement for the following frame is naturally the existence of motion, but the final judgement for the previous frame is indefinite, shown as "-" in the Table 1. In this embodiment, when the final judgement is indefinite "-", inter-frame interpolation is not used, to be on the safe side. Therefore, the intra-frame interpolation is also executed in pattern 2.

A judging pattern 3 indicates the case in which the final judgement for the previous frame is the existence of motion and the final judgement for the following frame is indefinite. In this pattern 3, intra-frame interpolation is executed for the reason described above.

Judging patterns 4 and 6 indicate the case in which both final judgements for the previous and following frames are indefinite. In these patterns, intra-frame interpolation is executed to be on the safe side.

Judging patterns 5,7 indicate the case in which the final judgement for the previous frame is no-motion and the final judgement for the following frame is the existence of motion or indefinite. In these patterns, inter-frame interpolation using only the previous frame is executed.

Judging patterns 8,9 indicate the case in which the final judgement for the following frame is no-motion and the final judgement for the previous frame is the existence of motion or indefinite. In these patterns, inter-frame interpolation using only the following frame is executed.

A judging pattern 10 indicates the case in which all of the comparison results are no motion. In this case, inter-frame interpolations using only the previous frame, only the following frame, or the average value of the previous and following frame can be used.

Figure 10:
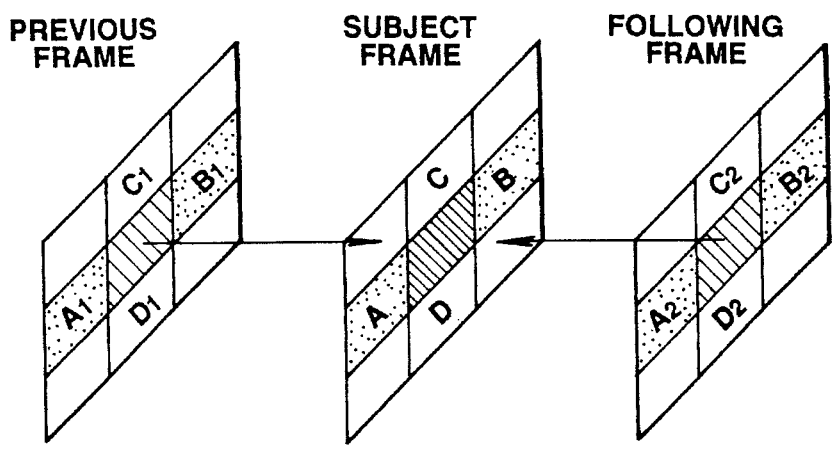
FIG. 10 is a model of a part of the image signal used for explaining another method of interpolation.

Refer now to FIG. 10. When the DC component or the criticality CR is missing because of an uncorrectable error or the like, it is possible to make the judgement by comparing the block A with block A1, block A with block A2, block B with block B1, block B with block B2, block C with block C1, block C with block C2, block D with block D1, or block D with block D2, in short, by comparing adjacent blocks in the previous and following frame with the subject block.

Figure 11:
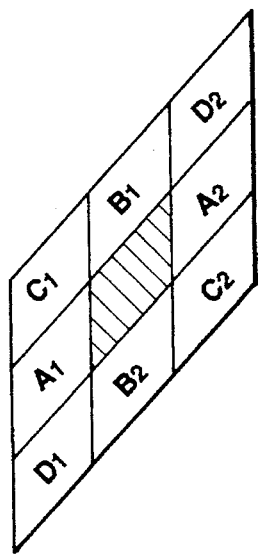
FIG. 11 is a model of a part of the image signal used for explaining a further method of interpolation.

Further, when it is impossible to compare the criticalities or the DC components of the subject block between the present frame and the previous or following frame, it is possible to interpolate the criticality or the DC component. For example, the most similar block to the subject block is determined among blocks surrounding it by comparing the DC components and the criticalities of the right and left blocks (A1 and A2), those of the upper and lower blocks (B1 and B2), those of the diagonal blocks (C1 and C2, or D1 and D2), shown in FIG. 11, and the interpolation for the DC component or the criticality is executed by using the most similar blocks decided by the procedure described above.

According to the description of Table 1, output of the motion discriminating circuit is composed of two or three bits and is supplied to a concealment selection circuit 39. The concealment selection circuit 39 executes inter-frame or intra-frame interpolation according to the output of the motion discriminating circuit 40.

Accordingly, a block in which an uncorrectable error has occurred is replaced with an appropriate interpolating block output from the concealment selection circuit 39 and the interpolating block is output to the raster scanning circuit via a terminal "d" of a switch 36 and a terminal 38.

According to the first embodiment described above, there are many effects listed below.

Firstly, the motion discrimination circuit used for selecting a switching interpolating method has a limited amount of hardware because of using only encoded DC components or the criticalities to be used for encoding are composed of a small amount of data.

Secondly, the motion discrimination has high dependability because the existence of motion is decided on the basis of not only the DC component but also the AC component of the image signal.

Thirdly, the amount of circuitry is not increased because the criticalities are originally necessary for the encoding circuit and are efficiently used in this embodiment.

Figure 12:
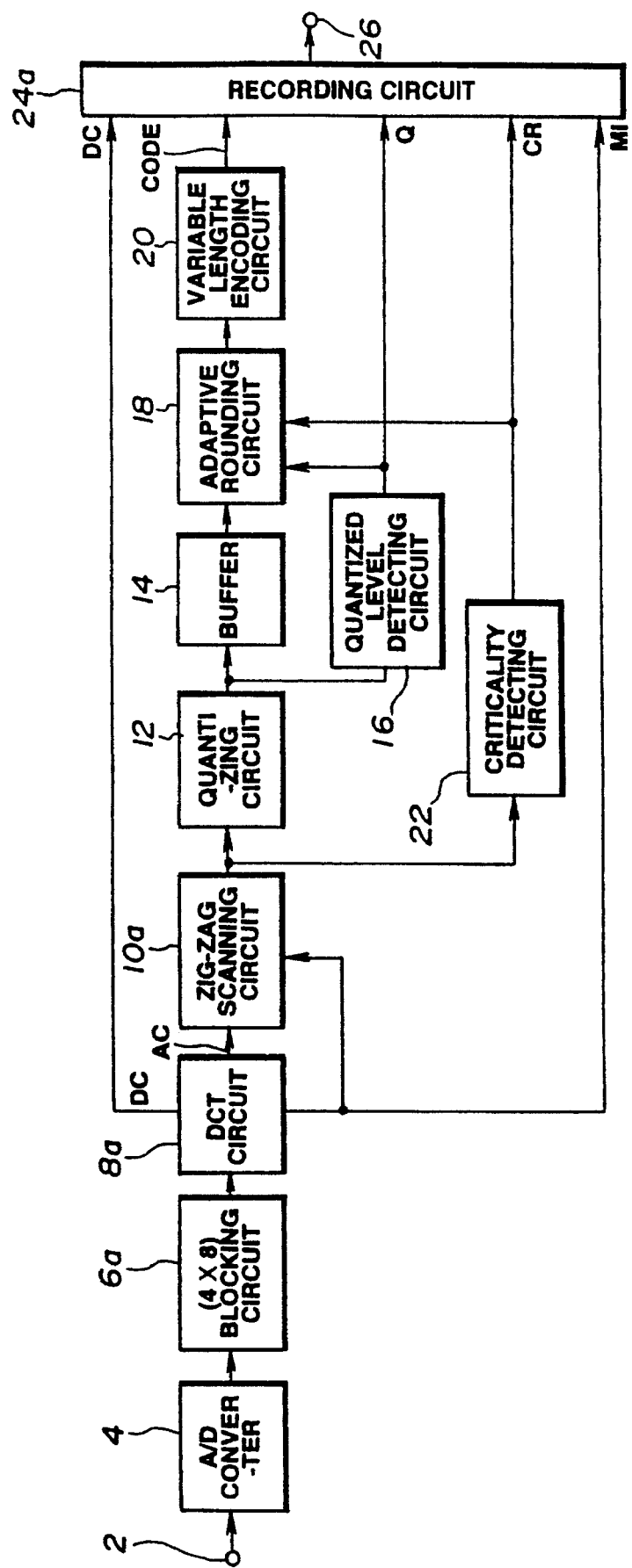
FIG. 12 is a block diagram showing a primary part of another image signal recording apparatus which is concerned with a second embodiment of the present invention.

A second embodiment of the present invention will be described below by referring to FIGS. 12 to 17. FIG. 12 is a block diagram of an image signal recording apparatus according to the second embodiment of the present invention. In FIG. 12, similar elements to those in FIG. 1 are given the same number.

The marked differences between FIG. 1 and FIG. 12 are in the DCT circuit and the blocking circuit. Thus, a (4×8) blocking circuit 6a and a DCT circuit 8a are described in detail by referring to FIG. 13.

Figure 13:
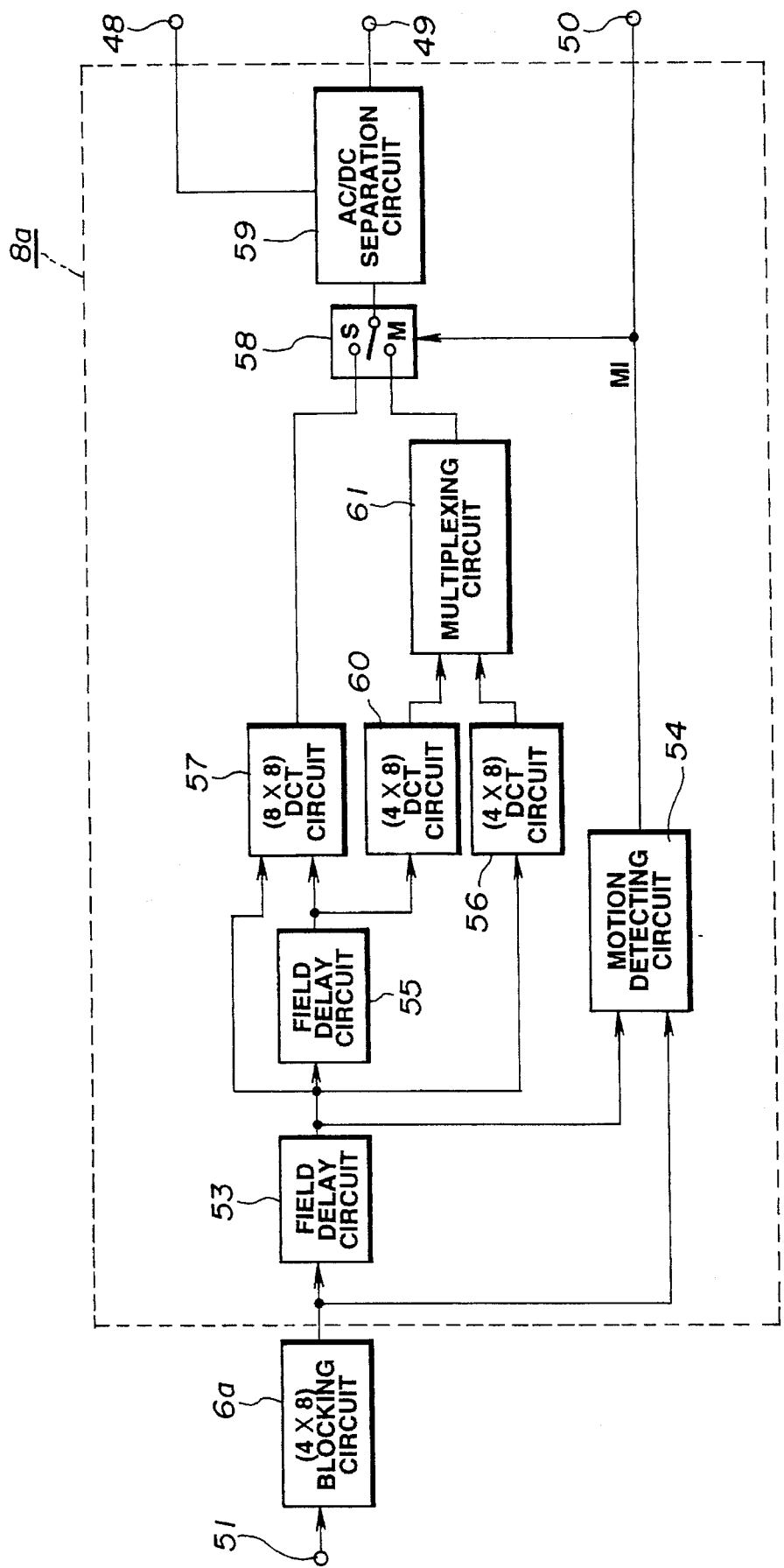
FIG. 13 is a block diagram which shows details of the DCT circuit shown generally in FIG. 12.

In FIG. 13, the digitized image signal input to an input terminal 51 from the A/D converter 4 is supplied to the (4×8) blocking circuit and is divided into (4×8) blocks each of which is composed of (4×8) pixels having 8 pixels in a horizontal direction and 4 pixels in a vertical direction. These (4×8) pixels are in the same field. The image signal divided into the (4×8) blocks is supplied to a field delay circuit 53 and a motion detecting circuit 54 in the DCT circuit 8a.

The output image signal delayed for one field period is supplied to a further field delay circuit 55, an (4×8) DCT circuit 56, an (8×8) DCT circuit 57 and the motion detecting circuit 54. The (4×8) block in a first field of a certain frame output from the field delay circuit 53 and the (4×8) block in a second field of the frame, which are concerned with a common (8×8) block in the frame, are simultaneously supplied to the motion detecting circuit 54.

Figure 14:
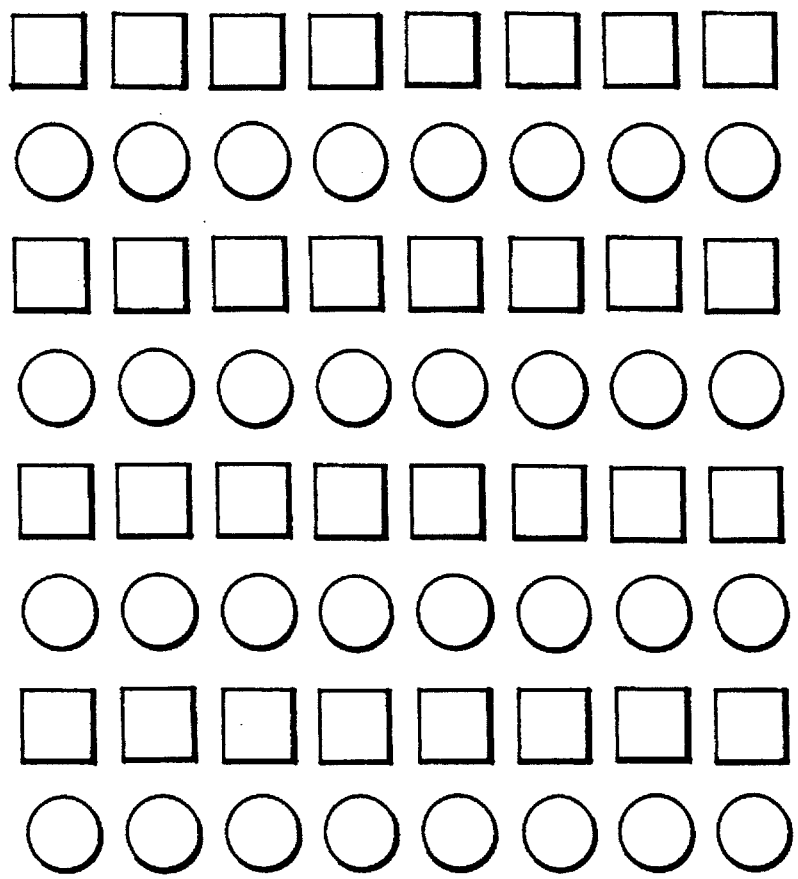
FIG. 14 shows a model of pixels in one block which are distinguished between odd and even fields.

FIG. 14 shows a model of pixels in a certain (8×8) block. In FIG. 14, thirty-two pixels shown as "○" are in the first field and comprise 4 lines each of which has 8 pixels, and the thirty-two pixels shown as "[□]" are in the second field and comprise 4 lines each of which has 8 pixels.

The motion detecting circuit 54 subtracts values of the 32 pixels in the first field from respective values of the 32 pixels in the second field located just above the 32 pixels in the first field, and sums the 32 absolute values of the subtracting result. Further, the motion detecting circuit 54 discriminates by determining that a considerable difference is involved in the subject (8×8) block between the fields and that motion exists, when the sum of the 32 absolute values exceeds a predetermined threshold value, and by determining that no motion exists in the subject (8×8) block when the sum of the 32 absolute values does not exceed the predetermined threshold value. The one-bit result of the discrimination is used for controlling a switch 58 and is supplied to a recording circuit 24a via a terminal 50.

The field delay circuit 55 delays the image signal output from the field delay circuit 53 for one field period of time and supplies it to the (8×8) DCT circuit 57 and a (4×8) DCT circuit 60. The (8×8) DCT circuit 57 discrete-cosine-transforms (8×8) pixels which are interlaced as shown in FIG. 14 directly, and outputs 32 coefficients to a terminal "S" of the switch 58.

The (4×8) DCT circuit 60 discrete-cosine-transforms (4×8) pixels in the first field, and outputs 16 coefficients to a mulitplexing circuit 61. The (4×8) DCT circuit 56 discrete-cosine-transforms (4×8) pixels in the second field, and outputs 16 coefficients to the multiplexing circuit 61.

The multiplexing circuit 61 multiplexes 16 coefficients of the first field and 16 coefficients of the second field and supplies the multiplexed coefficients to a terminal "M" of the switch 58. The switch 58 outputs the coefficients output from the (8×8) DCT circuit 57 via the terminal "S" when the subject block is discriminated as a block in a still area, and outputs the coefficients output from the multiplexing circuit 61 when the subject block is discriminated as a block in a motion area, in accordance with the discrimination result output from the motion detecting circuit 54.

The coefficients output from the switch 58 are supplied to an AC/DC separation circuit 59 which separates the DC component from the AC component. Only the DC component of the first field is separated as the DC component, while the DC component of the second field is not separated (as for the AC components). The DC component is directly supplied to a recording circuit 24a via a terminal 48 and the AC components and the DC component of the second field are supplied to a zig-zag scanning unit 10a.

The zig-zag scanning circuit 10a operates the same as the circuit 10 shown in FIG. 1 when the coefficients output from the (8×8) DCT circuit 57 are supplied. When the coefficients output from the multiplexing circuit 61 are supplied, the zig-zag scanning circuit 10a scans these coefficients of the two fields including the DC component of the second field from low frequency component to high frequency component. The operation of the zig-zag scanning circuit 10a is changed as described above on the basis of the discriminating result of the motion detecting circuit which is output from the DCT circuit 8a as motion information MI.

The operations of the circuits 12,14,16,18,20 and 22 are not described again because they are similar to the like circuits in FIG. 1. The recording circuit 24a outputs the transmitting signal composed of the sequence of the synchronizing blocks shown in FIG. 6 in which the identification codes include the motion information MI.

Figure 15:
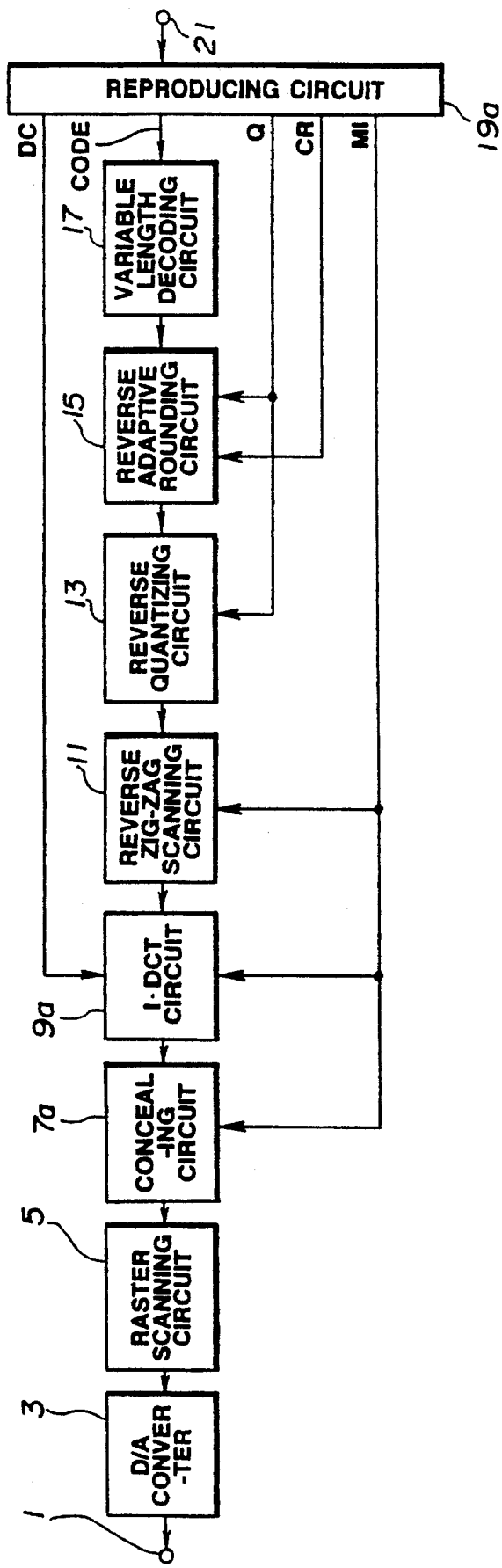
FIG. 15 is a block diagram showing a primary part of another image signal reproducing apparatus according to the second embodiment of the present invention for reproducing an image signal from the transmitted signal transmitted by the apparatus shown in FIG. 12.

FIG. 15 is a block diagram which shows a reproducing apparatus which reproduces the image signal from the transmitting signal transmitted by the apparatus shown in FIG. 12, as the second embodiment of the present invention. In FIG. 15, similar elements to those FIG. 7 are numbered the same.

The transmitted signal is input to a reproducing circuit 19a via a terminal 21. The reproducing circuit 19a reproduces the code sequence, and separates the DC components (DC), the compressed AC components (AC), the quantizing factors (Q), the criticalities (CR), and the motion information (MI). The motion information (MI) is supplied to a reverse zig-zag scanning circuit 11a, I-DCT circuit 9a and a concealing circuit 7a. The circuits 13,15 and 17 operate the same as in FIG. 7, and the reverse quantizing circuit 13 outputs the reverse-quantized coefficients.

The reverse zig-zag scanning circuit 11a changes the order of the coefficients into the original order, and supplies the coefficients to the I-DCT circuit 9a.

Figure 16:
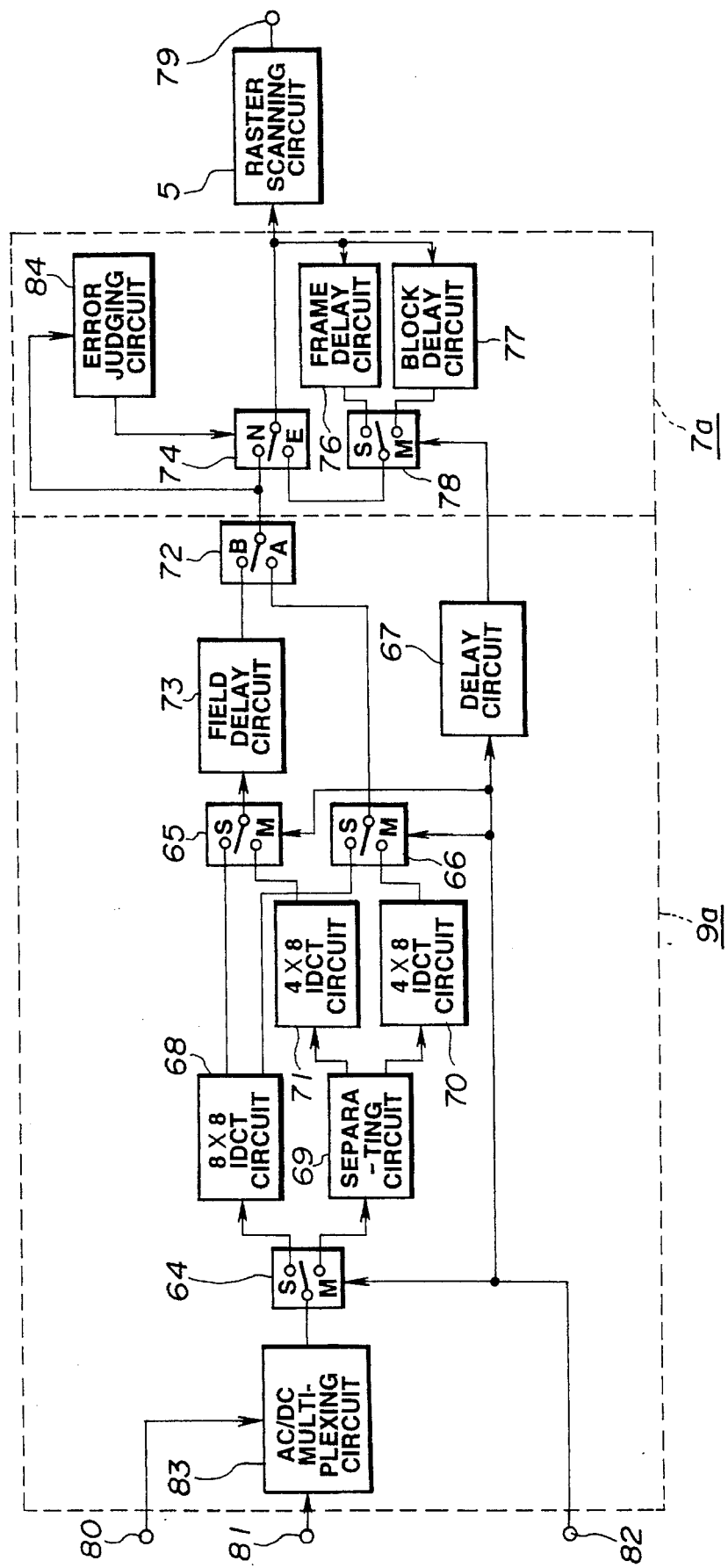
FIG. 16 is a block diagram which shows details of the I-DCT circuit 9 and the concealing circuit, which are shown generally in FIG. 15.

FIG. 16 is a block diagram which shows the I-DCT circuit 9a and the concealing circuit 7a in detail. In FIG. 16, the DC components separated by the reproducing circuit 19a are supplied to an input terminal 80, the AC components including the DC component of the second field are supplied to an input terminal 81, and the motion information (MI) is supplied to an input terminal 82. The error flags are supplied to the terminal 80 with the DC component. An AC/DC multiplexing circuit 83 multiplexes the AC components, the DC components, and error flags and supplies the multiplexed signal to a switch 64.

The motion information supplied to the input terminal 82 controls the switch 64, a switch 65, a switch 66 and is supplied to a delay circuit 67. The switch 64 connects the circuit 83 to a terminal "S" when the motion information indicates that the subject block is in the still area, and connects it to a terminal "M" when the motion information indicates that the subject block is in the motion area. The terminal "S" of the switch 64 is connected to an (8×8) I-DCT circuit 68, and the terminal "M" of the switch 64 is connected to a separating circuit 69.

When the subject block is in the still area, the coefficients input to the switch 64 are supplied to the (8×8) IDCT circuit 68 and are reverse-discrete-cosine transformed from the frequency domain to the amplitude domain. The image data of the first field transformed by the IDCT circuit 68 are supplied to a terminal "S" of a switch 66, and the image data of the second field transformed by the IDCT circuit 68 are supplied to a terminal "S" of a switch 65.

When the subject block is in a motion area, the coefficients input to the switch 64 are supplied to the separating circuit 69 and are separated into groups of first and second fields. The coefficients of the first field separated by the separating circuit 69 are supplied to a (4×8) IDCT circuit 70, and the coefficients of the second field separated by the separating circuit 69 are supplied to a (4×8) IDCT circuit 71. Each of the (4×8) IDCT circuits reverse-discrete-cosine-transforms the coefficients from the frequency domain to the amplitude domain.

The image data of the first field output from the (4×8) IDCT circuit 70 are supplied to a terminal "M" of the switch 66, and the image data of the second field output from the (4×8) IDCT circuit 71 are supplied to a terminal "M" of the switch 65. The switch 66 is switched by the motion information and supplies the image data output from the (8×8) IDCT circuit 68 or the (4×8) IDCT circuit as the image data of the first field to a terminal "A" of a switch 72. The switch 65 is switched by the motion information and supplies the image data output from the (8×8) IDCT circuit 68 or the (4×8) IDCT circuit 71 as the image data to a field delay circuit 73.

The field delay circuit 73 delays the image data of the second field for one field period of time and supplies the delayed image data to a terminal "B" of a switch 72. The switch 72 is switched every one field period and alternately outputs the image data of the first field via the terminal "A" and the image data of the second field via the terminal "B". The image signal output from the switch 72 is supplied to a terminal "N" of a switch 74.

An error judging circuit 84 judges whether or not the subject block involves uncorrectable code errors on the basis of the error flags transmitted with the DC components, and outputs a control signal to the switch 74. The switch 74 outputs the image signal output from the switch 72 via the terminal "N" when the subject block does not involve an uncorrectable code error, and outputs the image signal output from a switch 78 via the terminal "E" when the subject block involves an uncorrectable code error.

The image signal output from the switch 74 is supplied to a frame delay circuit 76, a block delay circuit 77, and the raster scanning circuit 5 shown in FIG. 15. The image signal output from the frame delay circuit 76 is supplied to a terminal "S" of the switch 78 and the image signal output from the block delay circuit 77 is supplied to a terminal "M" of the switch 78.

The delay circuit 67 outputs the motion information to judge whether the subject block is in the motion area or not. Various approaches may be applied to design the delay circuit 67, some of these ideas are listed below.

A first approach is that the delay circuit 67 outputs the motion information of the adjacent block to the subject block, because there is a high possibility that the motion information involves uncorrectable errors when the image data of the subject block involves uncorrectable errors and the motion information is transmitted in the same synchronizing block.

A second approach is that the delay circuit 67 outputs the motion information of the subject block by compensating the processing time, when the motion information can be corrected, even if the image information involves uncorrectable errors, by adding sufficient redundant codes to the motion information.

A third approach is that the delay circuit 67 outputs the motion information of the subject block which is located in a different synchronizing block from the synchronizing block in which the image data of the subject block is located.

It is effective that the second or third approach is used because the motion information is correctably detected in the recording apparatus.

The switch 78 selects the image signal output from the frame delay circuit 76 when the subject block is judged to involve no motion, and selects the image signal output from the block delay circuit 77 when the subject block is judged to involve motion. In short, the switch 78 selects the inter-frame interpolation or the intra-frame interpolation.

The frame delay circuit 76 delays the image signal for one frame period of time to replace all of the (8×8) pixels of the subject block with the (8×8) pixels of the block located at the same position in the previous frame as the subject block.

Figure 17:
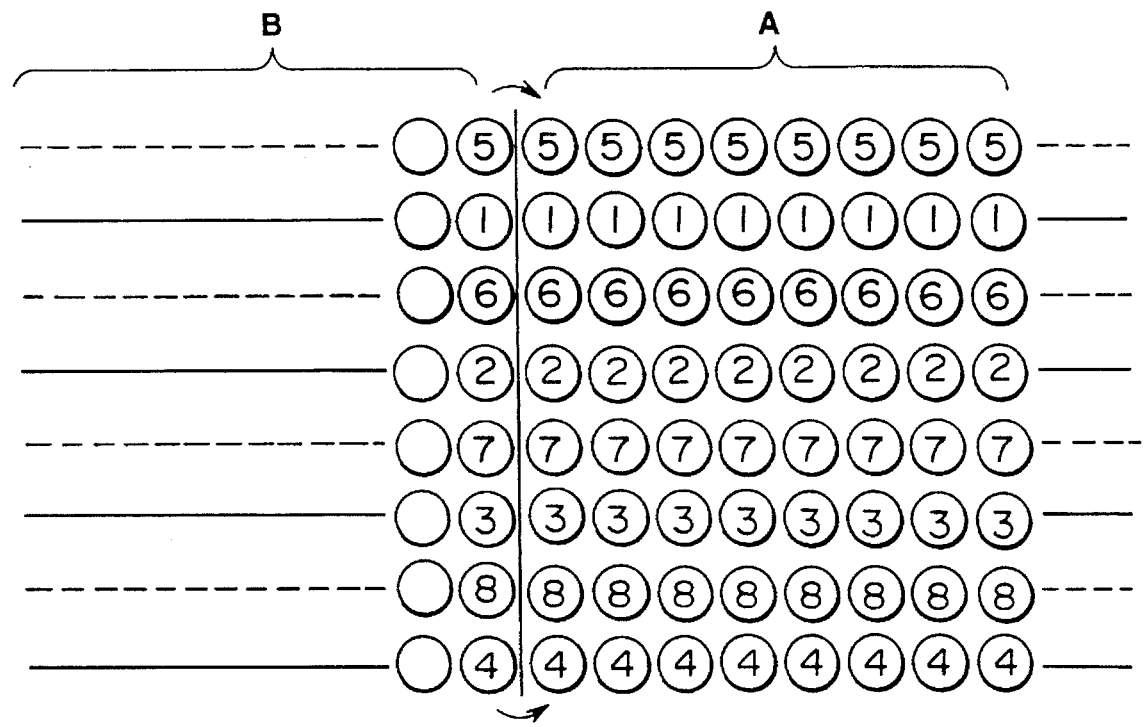
FIG. 17 is a model of pixels in two adjacent blocks used for explaining one method of an intra-frame interpolation.

The block delay circuit 77 repeatedly outputs eight pixels in the adjacent left block which are the eight pixels closest to the subject block shown in FIG. 17 as 1 to 8 to replace the (8×8) pixels of the subject block with the created block shown in FIG. 17 as the block A.

The switch 74 is switched according to the control signal output from the error judging circuit 84, and outputs the concealed image signal to the raster scanning circuit 5. The raster scanning circuit 5 outputs the image signal in an order corresponding to the raster scanning to the D/A converter 3 via a terminal 79.

Further, it is possible to use the motion detecting circuit 23 shown in FIG. 8 for the motion detecting circuit shown in FIG. 13.

According to the second embodiment described above, there are many effects listed below.

Firstly, a motion detecting circuit is not necessary in the reproducing (receiving) apparatus. Therefore, the reproducing (receiving) apparatus, which is expected to be manufactured to a greater extent than the recording (transmitting) apparatus, becomes smaller in size. Accordingly a diffusion of the system which transmits and receives the image data is promoted.

Secondly, the adaptive interpolation can depend on the motion detecting result of the subject block, not of the adjacent block. Therefore, the adaptive interpolation becomes more faithful to the original image.

As described above, the present invention has many effects to improve the concealed image.

We claim:

1. An image signal reproducing device, comprising:
   (a) receiving means for receiving a transmitted signal from a transmitting path, the transmitted signal including image data and subordinate data different from the image data, the subordinate data indicating levels of alternating components of the image data; and
   (b) error concealing means for concealing code errors in the transmitted signal, said error concealing means determining an error concealing characteristic to be carried out thereby in accordance with the subordinate data received by said receiving means.

2. A device according to claim 1, wherein said error concealing means determines the error concealing characteristic in accordance with the subordinate data and direct information indicating a level of a direct component of the image data.

3. A device according to claim 2, wherein said error concealing means comprises a motion detecting circuit which provides two motion detecting results, one of the results being detected according to the current subordinate data, the other of the results being detected according to the direct current information.

4. A device according to claim 3, wherein said error concealing means selectively executes an inter-frame interpolation using image data in a frame other than a subject frame to be concealed and an intra-frame interpolation using image data only in the subject frame, and wherein said concealing means executes the intra-frame interpolation unless both interpolation results indicate less than a predetermined amount of motion of the image between the subject frame and the other frame.

5. A device according to claim 1, wherein the image data are encoded as a block composed of a plurality of pixels, and the subordinate data is included for each of the blocks.

6. A device according to claim 5, wherein said error concealing means determines the error concealing characteristic for each block.

7. A device according to claim 5, wherein the image data are encoded according to an encoding characteristic which is determined on the basis of the subordinate data for each block.

8. A device according to claim 5, wherein the image data are orthogonally transformed from an amplitude domain to a frequency domain, and the subordinate data is formed on the basis of orthogonally transformed coefficients included in each block.

9. A device according to claim 8, wherein the subordinate data is formed on the basis of whether or not the orthogonally transformed coefficients exceed a predetermined value.

10. A device according to claim 9, wherein the subordinate data is formed according to a number of orthogonally transformed coefficients exceeding the predetermined value.

11. An image signal processing device, comprising:
    (a) input means for inputting an image signal divided into a plurality of blocks, each block being composed of a plurality of pixels; and
    (b) motion detecting means for detecting motion involved in the image signal on the basis of AC information indicating a level of alternating components of each block of the image signal and DC information indicating a level of direct component of the image data.

12. A device according to claim 11, wherein said motion detecting means provides two motion detecting results, one of the results being detected according to the AC component information, the other of the results being detected according to the DC component information.

13. A device according to claim 12, wherein said motion detecting means finally judges that the image signal involves motion unless both detection results indicate less than a predetermined amount of motion of the image.

14. A device according to claim 11, wherein each block of the image signal is orthogonally transformed from an amplitude domain to a frequency domain, and the AC component information is formed on the basis of orthogonally transformed coefficients included in each block.

15. A device according to claim 14, wherein the AC component information is formed on the basis of whether or not the orthogonally transformed coefficients exceed a predetermined value.

16. A device according to claim 15, wherein the AC component information is formed according to a number of orthogonally transformed coefficients exceeding the predetermined value.

17. An image signal reproducing device, comprising:
    (a) receiving means for receiving a transmitted signal from a transmitting path, the transmitted signal including image data and motion data which indicate whether or not the image data involves motion, the motion data consisting of single-bit digital data; and
    (b) error concealing means for concealing code errors in the transmitted signal, said error concealing means determining an error concealing characteristic to be carried out thereby in accordance with the motion data received by said receiving means.

18. A device according to claim 17, wherein the motion data are produced by comparing image data between two fields in a subject frame.

19. A device according to claim 18, wherein said error concealing means selectively executes an inter-frame interpolation using image data in a frame other than the subject frame and an intra-frame interpolation using image data only in the subject frame in accordance with the motion data.

20. A device according to claim 17, wherein the image data are encoded with compressed codes and an encoding characteristic of the image data is determined on the basis of the motion data, the device further comprising decoding means for decoding the encoded image data in accordance with the motion data received by said receiving means.

21. A device according to claim 20, wherein the motion data are produced by comparing image data between two adjacent fields and indicate whether the image data are encoded in each field or each frame, and said decoding means decodes the image data in each field or each frame in accordance with the motion data.

22. A device according to claim 21, wherein said error concealing means selectively executes an inter-frame interpolation using image data in a frame other than a subject frame to be concealed and an intra-frame interpolation using image data only in the subject frame in accordance with the motion data.

23. An image signal processing method, comprising the steps of:

detecting motion involved in an image signal to be transmitted, to produce motion information consisting of single-bit digital data;

transmitting the image signal and the motion information to a transmitting path;

receiving the image signal and the motion information from the transmitting path; and concealing code errors in the transmitted image signal according to an operating characteristic determined on the basis of the transmitted motion information.

24. An image signal reproducing device, comprising:

(a) receiving means for receiving transmitted signals, the transmitted signals having image data divided into a plurality of blocks and coded in each said block as a unit, and motion data indicating whether the image data involve motion or not, said motion data consisting of a plurality of single-bit digital data which indicate whether motion of the plurality of blocks exists or not, and each of the plurality of single-bit digital data being added to a respective one of the plurality of blocks and transmitted, the image data being coded in accordance with the motion data;

(b) decoding means for decoding the coded image data, a characteristic of decoding in said decoding means being determined on the basis of the motion data; and (c) error concealing means for concealing code errors in the transmitted signal, said error concealing means determining an error concealing characteristic to be carried out thereby on the basis of the motion data.

25. A device according to claim 24, wherein the motion data are produced by comparing image data between two fields in a subject frame.

26. A device according to claim 24, wherein the coded image data are orthogonally transformed from an amplitude domain to a frequency domain, and the motion data is formed on the basis of orthogonally transformed coefficients included in the image data.

27. A device according to claim 24, wherein the motion data are produced by comparing image data between two adjacent fields, and indicate whether the image data are encoded in each field or each frame, and wherein each decoding means decodes the image data in each field or each frame in accordance with the motion data.

28. A device according to claim 27, wherein said error concealing means selectively executes an inter-frame interpolation using image data in a frame other than that having an error to be concealed and an intra-frame interpolation using image data only in a subject frame in accordance with the motion data.

29. An image reproducing apparatus, comprising:

(a) receiving means for receiving transmitted signals from a transmitting path, the transmitted signals including image data and motion data indicating whether or not motion between images of two fields in a subject frame exists; and (b) error concealing means for concealing errors in the image data received by said receiving means by using a plurality of concealing methods, the plurality of concealing methods including an intra-frame method in which said error concealing means conceals the errors by using image data of a frame including the errors and an inter-frame method in which said error concealing means conceals the errors by using image data of a frame different from the frame including the errors, said error concealing means determining which of the concealing methods to use according to the motion data received by said receiving means.

30. An apparatus according to claim 29, wherein the motion data are generated by comparing of image data of two fields of the frame including the errors.

31. An apparatus according to claim 29, wherein said error concealing means performs the intra-frame method when the motion data indicate the motion exists, and performs the inter-frame method when the motion data indicate the motion does not exist.

32. An apparatus according to claim 29, wherein the motion data consisting of one-bit digital data.

* * * * *

UNITED STATES PATENT AND TRADEMARK OFFICE
CERTIFICATE OF CORRECTION

PATENT NO. : 5,570,199

DATED : October 29, 1996

INVENTORS : YASUYUKI TANAKA ET AL.

It is certified that error appears in the above-identified patent and that said Letters Patent is hereby corrected as shown below:

ON TITLE PAGE

[56] FOREIGN PATENT DOCUMENTS

"282135A1  3/1988 Euro. Pat. Off." should read
--282135A1  9/1988 Euro. Pat. Off.--;
"415699A3  10/1991 Euro. Pat. Off." should read
--415699A3  3/1991 Euro. Pat. Off.--;
"493128A2  12/1991 Euro. Pat. Off." should read
--493128A2  7/1992 Euro. Pat. Off.--.

COLUMN 1

Line 63, "decided" should read --determined--.

COLUMN 2

Line 12, "utilizing" should read --without utilizing--.

COLUMN 6

Line 20, "Switches 35,36" should read --Switches 35, 36--;

UNITED STATES PATENT AND TRADEMARK OFFICE
CERTIFICATE OF CORRECTION

PATENT NO. : 5,570,199

DATED : October 29, 1996

INVENTORS : YASUYUKI TANAKA ET AL.

It is certified that error appears in the above-identified patent and that said Letters Patent is hereby corrected as shown below:

COLUMN 6 continued

Line 45, "they reproduced" should read --they are reproduced--;

Line 48, "DC1,DC2,DC3" should read --DC1, DC2, DC3--.

COLUMN 8

Line 43, "patterns 8,9" should read --patterns 8, 9--.

COLUMN 9

Line 64, "[□]" should read --"□"--.

COLUMN 10

Line 55, "circuits 12,14,16,18,20" should read --circuits 12, 14, 16, 18, 20--;

UNITED STATES PATENT AND TRADEMARK OFFICE
CERTIFICATE OF CORRECTION

PATENT NO. : 5,570,199

DATED : October 29, 1996

INVENTORS : YASUYUKI TANAKA ET AL.

It is certified that error appears in the above-identified patent and that said Letters Patent is hereby corrected as shown below:

COLUMN 10 continued

Line 66,   "those" should read --those in--.

COLUMN 14

Line 14,   "componnent" should read --a component--.

COLUMN 16

Line 42,   "consisting" should read --consists--.

Signed and Sealed this

First Day of April, 1997

Attest:

BRUCE LEHMAN

Attesting Officer     Commissioner of Patents and Trademarks